United States Patent [19]

Terasaka et al.

[11] Patent Number: 4,852,515
[45] Date of Patent: Aug. 1, 1989

[54] DEVICE FOR AUTOMATICALLY CONTROLLING COATING AMOUNT FOR USE IN COATING MACHINE

[75] Inventors: Yoshiyasu Terasaka, Ibaraki; Masao Tanabe, Osaka, both of Japan

[73] Assignee: Chugai Ro Co, Ltd., Japan

[21] Appl. No.: 875,624

[22] Filed: Jun. 18, 1986

Related U.S. Application Data

[63] Continuation of Ser. No. 610,691, May 16, 1984, abandoned.

[30] Foreign Application Priority Data

May 25, 1983 [JP] Japan .................................. 58-93247

[51] Int. Cl.⁴ ............................................. B05C 11/00
[52] U.S. Cl. .................................... 118/663; 118/262; 72/16; 100/47
[58] Field of Search ................ 118/663, 262; 101/247; 100/47, 50; 72/16, 18

[56] References Cited

U.S. PATENT DOCUMENTS

| | | | |
|---|---|---|---|
| 3,613,419 | 10/1971 | Silva | .................................... 72/16 X |
| 3,989,937 | 11/1976 | Fay et al. | ........................ 118/663 X |
| 4,351,237 | 9/1982 | Tappert et al. | ................... 100/47 X |

Primary Examiner—Shrive Beck
Assistant Examiner—Alain Bashore
Attorney, Agent, or Firm—Jackson & Jones

[57] ABSTRACT

A device for automatically controlling coating amount for use in a coating machine including a backup roll, an applicator roll, a pickup roll, a base, a first table slidably mounted on the base and a second table slidably mounted on the first table. The device includes first and second pressure adjusting mechanisms for adjusting a pressure between the backup roll and the applicator roll and a pressure between the applicator roll and the pickup roll. Each of the first and second pressure adjusting mechanisms further includes a sensor, a stepping motor and a precision ball bearing screw member.

13 Claims, 4 Drawing Sheets ns and the 41, 42 and 43 are operated by means of a
DEVICE FOR AUTOMATICALLY CONTROLLING COATING AMOUNT FOR USE IN COATING MACHINE This is a continuation of application Ser. No. 610,691, filed May 16, 1984, now abandoned.

BACKGROUND OF THE INVENTION

The present invention generally relates to a coating machine and more particularly, to a device for automatically controlling coating amount for use in the coating machine.

As shown in FIGS. 1 and 2, conventionally, in coating machines, it has been so arranged as disclosed, for example, in Japanese Laid-Open Utility Model Application No. 131869/1982 (Jikkaisho 57-131869) that an applicator roll 1 for applying paint to a sheet-like workpiece 22 pressed onto a backup roll 23 is secured to a first table 4. A pickup roll 2 for picking up paint stored in a pickup pan is secured to a second table 5, while a metering roll 3 is secured to a third table 6. The first table 4, the second table 5 and the third table 6 are slidably mounted on a base 19. Furthermore a first pressure adjusting mechanism 41 adjusts the contact pressure between the backup roll 23 and the applicator roll 1 by moving the first table 4 relative to the base 19. Mechanism 41 is mounted on the base 19 and engages the first table 4. A second pressure adjusting mechanism 42 adjusts the contact pressure between the applicator roll 1 and the pickup roll 2 by moving the second table 5 relative to the first table 4. Mechanism 42 is mounted on the first table 4 and engage the second table 5. A third pressure adjusting mechanism 43 adjust a contact pressure between the pickup roll 2 and the metering roll 3 by moving the third table 6 relative to the second table 5. Mechanism 43 is mounted on the second table 5 and engages the third table 6. Thus, thickness of a coating film on the workpiece 22 can be adjusted by operating the first, second and third pressure adjusting mechanisms 41, 42 and 43.

It should be understood that the applicator roll 1 is required to be quickly retracted away from the backup roll 23 just before a seam 26 of the workpiece 22 passes therebetween. To this end, a cylinder 20 is attached to the base 19 and is coupled with the first pressure adjusting mechanism 41 through a lever 33. Just before the seam 26 of the workpiece 22 passes between the backup roll 23 and the applicator roll 1, the first table 4 is quickly moved relative to the base 19 by the cylinder 20 in the leftward direction in FIG. 1, whereby the applicator roll 1 is quickly retracted away from the backup roll 23.

As best shown in FIG. 2, each of the first and second pressure adjusting mechanisms 41, 42 and 43 comprises a worm gearing composed of a worm 28 and a worm wheel 29, a rotary device (not shown) such as a hydraulic motor, a DC motor, etc. for driving the worm 28, a screw shaft 30 and a nut 14 (FIG. 1). The screw shaft 30 is unrotatably but axially movably mounted in the worm wheel 29 by a key 31 fitted into a key way 32 of the screw shaft 30 and is attached, at one end thereof, to the level 33. The first, second pressure adjusting mechanisms and the 41, 42 and 43 are operated by means of a manual handle based on skill of an operator. Thus, the prior art pressure and adjusting mechanisms have the disadvantages that skill of the operator is required for the operation and it is impossible to maintain each of the pressures between adjacent ones of the backup roll, the applicator roll, the pickup roll and the metering roll and the pickup roll at predetermined pressure values. Furthermore, the known pressure and adjusting mechanisms have such inconveniences that it is extremely difficult to operate them at higher speed and make them larger in size. Meanwhile, the known pressure adjusting mechanisms have been disadvantageous in that it is impossible to cope with minute changes in each pressure and the clearance due to rotation, swell, etc. of each roll. Moreover, the prior art pressure adjusting mechanisms have such a disadvantage that, in case each of the first, second and third tables are driven by a hydraulic motor or a DC motor through the worm gearing having a considerable play, it is impossible to accurately control each of contact pressures between adjacent ones of the rolls in forward and reverse rotations of the worm gearing. In addition, the known pressure adjusting mechanisms have such an inconvenience that, when a restrictive torque is continuously generated in the DC motor, its commutator is heated, thereby resulting in seizing thereof.

SUMMARY OF THE INVENTION

Accordingly, an essential object of the present invention is to provide an improved device for automatically controlling coating amount for use in a coating machine, in which each of contact pressures between adjacent rolls is detected as a detection signal, by a pressure sensor. The sensed pressure of each pair is compared with a preset value and then, a stepping motor is rotated forwardly or reversely through a step angle on the basis of a comparison signal which indicates the difference between the detection signal detected by the sensor and the present value such that each roll is moved toward or away from a corresponding neighboring one of the rolls. The roll movement is accomplished by a precision ball screw upon rotation of the stepping motor, whereby contact pressures between adjacent rolls, i.e., thickness of a coating film on a workpiece can be adjusted, with substantial elimination of the disadvantages inherent in conventional adjusting mechanisms of this kind.

Another important object of the present invention is to provide an improved device of the above prescribed type which is highly reliable in actual use and can be readily incorporated into coating machines and the like at low cost.

In accomplishing these and other objects according to one preferred embodiment of the present invention, there is provided an improved device for automatically controlling coating amount for use in a coating machine including a backup roll, an applicator roll, a pickup roll for picking up paint stored in a pickup pan, a base, a first table slidably mounted on said base, and a second table slidably mounted on said first table such that said applicator roll and said pickup roll are, respectively, secured to said first table and said second table, said device comprising: a first pressure adjusting mechanism for adjusting a contact pressure between said backup roll and said applicator roll such that said applicator roll is brought into pressing contact with said backup roll at a first preset value representing a first preset contact therebetween; and a second pressure adjusting mechanism for adjusting contact pressure between said applicator roll and said pickup roll such that said pickup roll is brought into pressing contact with said applicator roll at a second preset value representing a second preset contact pressure therebetween; said first pressure adjusting mechanism further comprising: a first sensor for detecting a signal representing a contact pressure produced between said applicator roll and said backup roll; a first stepping motor arranged to be driven for rotation thereof in accordance with a difference between the signal detected by said first sensor and the first preset value; and a first precision ball bearing screw members for moving said first table relative to said base upon the rotation of said first stepping motor such that said applicator roll is moved toward or away from said backup roll; said second pressure adjusting mechanism further comprising: a second sensor for detecting a signal representing a contact pressure produced between said pickup roll and said applicator roll; a second stepping motor arranged to be driven for rotation thereof in accordance with a difference between the signal detected by said second sensor and the second preset value; and a second precision ball bearing screw member for moving said second table relative to said first table upon the rotation of said second stepping motor such that said pickup roll is moved toward or away from said applicator roll.

In accordance with the present invention, once the contact pressures have been set, it becomes possible to automatically adjust thickness of the coating film on the workpiece accurately by the use of the stepping motors and the precision ball bearing screw members both capable of performing forward or reverse movement through microns even if swell of the rolls takes place, and to precisely control the thickness of the coating film without shocks by varying the step advancing (or retracting) speed according to the program in case of temporary release of a seam of the workpiece to be coated.

BRIEF DESCRIPTION OF THE DRAWINGS

These and other objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
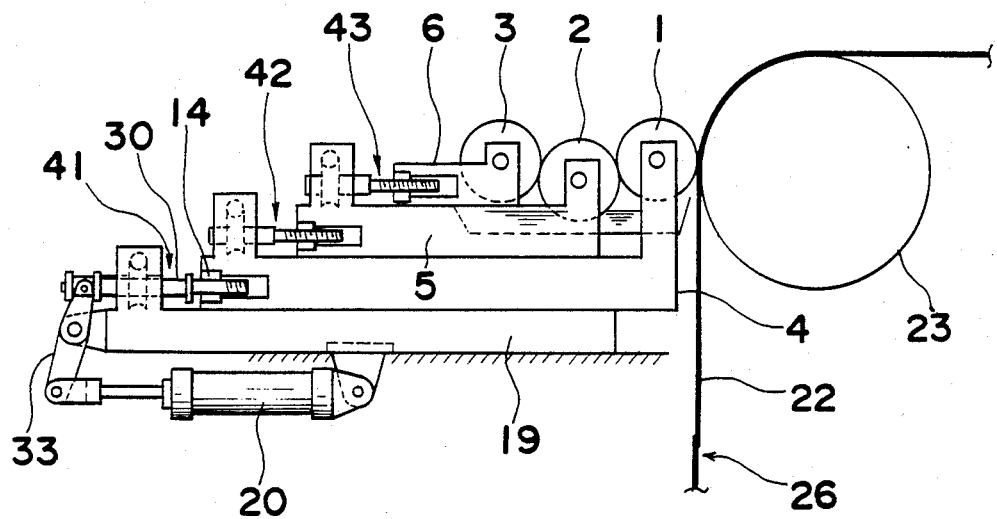
FIG. 1 is a front elevational view of a prior art coating machine (already referred to)
Figure 2:
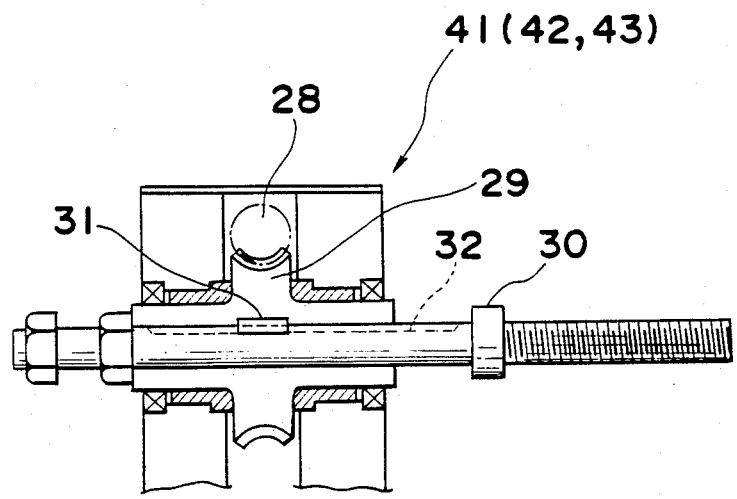
FIG. 2 is a partially sectional view of a pressure adjusting mechanism employed in the prior art coating machine of FIG. 1 (already referred to)
Figure 3:
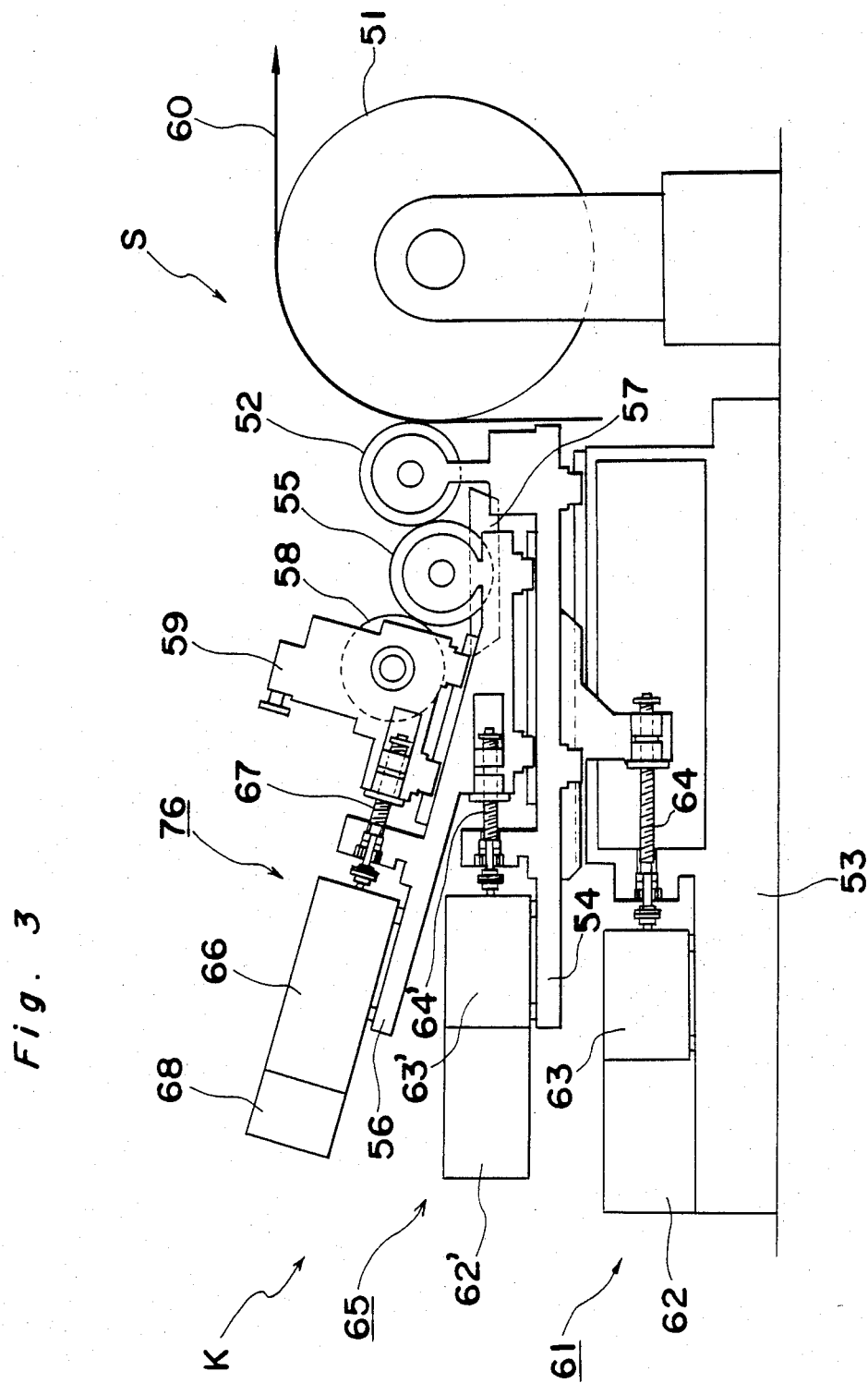
FIG. 3 is a front elevational view of a coating machine in which a device for automatically controlling coating amount according to the present invention is incorporated.
Figure 4:
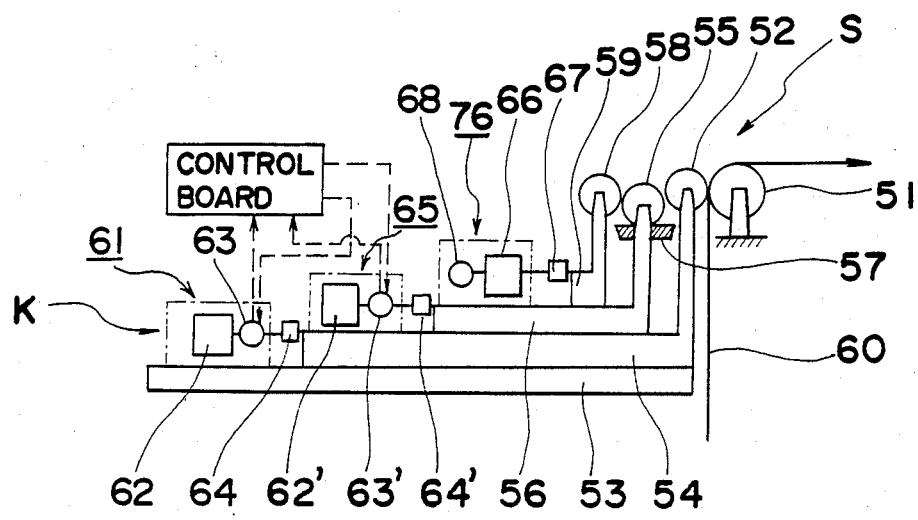
FIG. 4 is a schematic view of the coating machine of FIG. 3.

Referring now to the drawings, there is shown in FIGS. 3 and 4, a coating machine S in which a device K for automatically controlling coating amount according to the present invention is incorporated. The coating machine S generally includes a backup roll 51, an applicator roll 52 made of elastic material such as rubber, a pickup roll 55 for picking up paint stored in a pickup pan 57, a metering roll 58, a base 53, a first table 54 slidably mounted on the base 53, a second table 56 slidably mounted on the first table 54, and a third table 59 slidably mounted on the second table 56 such that the applicator roll 52, the pickup roll 55 and the metering roll 58 are, respectively, secured to the first table 54, the second table 56 and the third table 59, with a sheet-like workpiece 60 subjected to coating being passed between the backup roll 51 and the applicator roll 52. It is to be noted that such an arrangement of the coating machine S is already known and each of the backup roll 51, the applicator roll 52, the pickup roll 55 and the metering roll 58 is driven by a hydraulic motor or a DC (or AC) motor (not shown).

Figure 6:
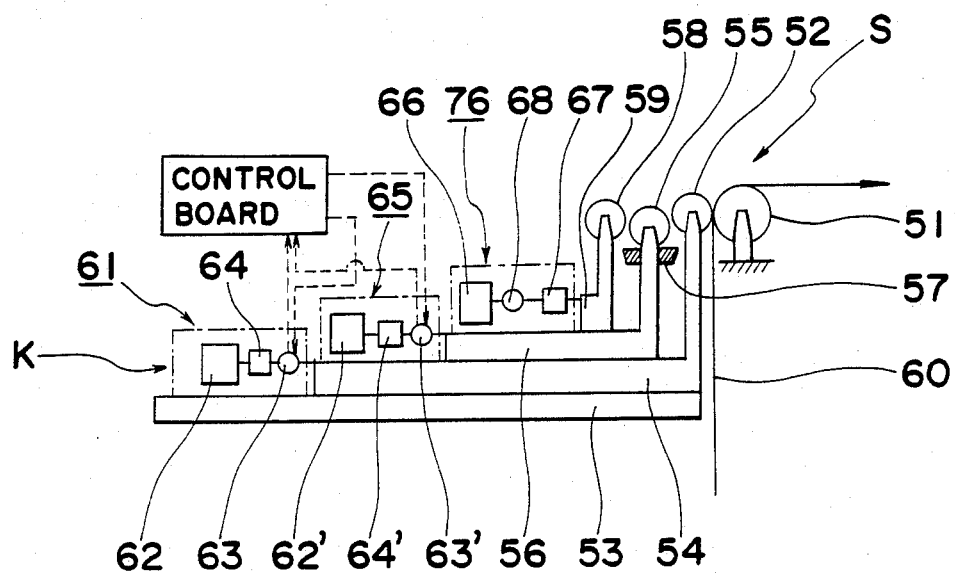
FIG. 6 is a view similar to FIG. 4, particularly showing a modification thereof.

Meanwhile, the device K of the present invention includes a first pressure adjusting mechanism 61 for adjusting a contact pressure between the backup roll 51 and the applicator roll 52, a second pressure adjusting mechanism 65 for adjusting contact pressure between the applicator roll 52 and the pickup roll 55 and a control board to be described later. The first clearance pressure mechanism 61 is arranged to move the first table 54 relative to the base 53 such that the applicator roll 52 is brought into pressing contact with the backup roll 51. Likewise, the second pressure adjusting mechanism 65 is arranged to move the second table 56 relative to the first table 54 such that the pickup roll 55 is brought into pressing contact with the applicator roll 52. More specifically, the first pressure adjusting mechanism 61 includes a stepping motor 62, a sensor 63 and a precision ball bearing screw member 64. The sensor 63 may be of any known contact pressure type. The stepping motor 62 and the contact pressure sensor 63 coupled to the stepping motor 62 are mounted on the base 53, while the precision ball bearing screw member 64 is mounted on the first table 54 so as to be coupled to the stepping motor 62 through the sensor 63. It is so arranged that the first table 54 is moved relative to the base 53 by the precision ball screw member 64 upon rotation of the stepping motor 62 such that the applicator roll 52 is moved toward or away from the backup roll 51. The sensor 63 and the precision ball bearing screw member 64 are operatively associated with the control board and can be exchanged, in position, with each other as shown in FIGS. 4 and 6. In the same manner as the first pressure adjusting mechanism 61, the second pressure adjusting mechanism 65 includes a stepping motor 62', a contact pressure 63' and a precision ball bearing screw member 64'. The stepping motor 62' and the sensor 63' coupled to the stepping motor 62' are mounted on the first table 54, while the precision ball bearing screw member 64' is mounted on the second table 56 so as to be coupled to the stepping motor 62' through the sensor 63'. It is so arranged that the second table 56 is moved relative to the first table 54 by the precision ball screw 64' upon rotation of the stepping motor 62' such that the pickup roll 55 is moved toward or away from the applicator roll 52. The sensor 63' and the precision ball bearing screw member 64' are operatively associated with the control board and can be exchanged, in position, with each other as shown in FIGS. 4 and 6.

The device K further includes a third pressure adjusting mechanism 76 for adjusting a third pressure between the pickup roll 55 and the metering roll 58. The third pressure adjusting mechanism 76 is arranged to move the third table 59 relative to the second table 56 such that the metering roll 58 is brought into a pressure relative the pickup roll 55. The third pressure adjusting mechanism 76 includes a stepping motor 66, a precision ball bearing screw member 67 and a sensor 68, for instance, a roll clearance sensor. The stepping motor 66 and the sensor 68 composed of, for example, a pulse encoder coupled to the stepping motor 66 are mounted on the second table 56, while the precision ball bearing screw member 67 is mounted on the third table 59 so as to be coupled to the sensor 68 through the stepping motor 66. The stepping motor 66 and the sensor 68 can be exchanged, in position, with each other as shown in FIGS. 4 and 6. It is so arranged that the third table 59 is moved relative to the second table 56 by the precision ball bearing screw member 67 upon the rotation of the stepping motor 66 such that the metering roll 58 is moved toward or away from the pickup roll 55. The clearance between the two controls the coating thickness being applied to material 60. It is to be noted that the precision ball bearing screw members 64, 64' and 67 are arranged to directly move, upon rotation thereof, the first, second and third tables 54, 56 and 59, respectively and, for example, NSK precision ball bearing screw members (name used in trade and manufactured by Nippon Seiko K.K., Japan) can be employed therefor.

Figure 5:
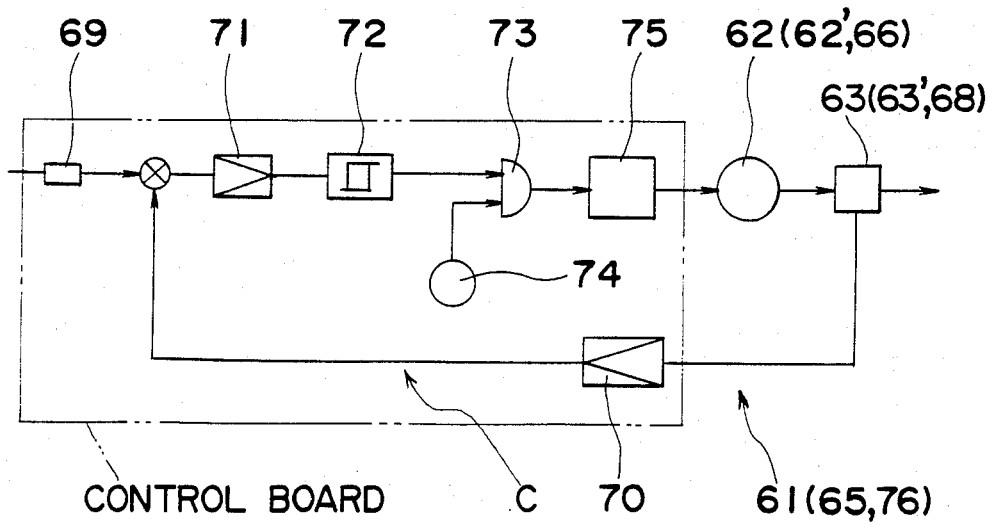
FIG. 5 is a control circuit diagram of the device of FIG. 3.

Meanwhile, as shown in FIG. 5, the control board includes a pair of control circuits C connected to the first pressure adjusting mechanism 61 and the second pressure adjusting mechanism 65, respectively. Namely, when a preset contact pressure to be applied from the applicator roll 52, through the workpiece 60, to the backup roll 51 has been given to a presetter 69 as a preset signal in the first pressure adjusting mechanism 61, a contact pressure applied from the applicator roll 52 to the backup roll 51 is detected as a reaction force of elastic material of the applicator roll 52 and thus, a contact pressure between the applicator roll 52 and the backup roll 51 is detected through the precision ball bearing screw member 64 by the sensor 63. This detection signal of the sensor 63 is transmitted via an amplifier 70 for the sensor 63 so as to be compared with the preset signal from the presetter 69 and then, is applied to a comparator circuit 72 by way of a preamplifier 71. In the case where a difference between the detection signal of the sensor 63 and the preset signal from the presetter 69 exceeds a predetermined value, a comparator signal is delivered from the comparator circuit 72 and then, the gate circuit 73 is opened, so that a pulse signal is inputted to a driver unit 75 on the basis of a frequency of an oscillator 74 connected to the gate circuit 73, the frequency being varied by a preset program. Thus, the stepping motor 62 is rotated forwardly or reversely at a given programmed speed through a predetermined angle by a power signal from the drive unit 75. Upon the rotation of the stepping motor 62, the first table 54 is moved relative to the base 53 by the precision ball bearing screw member 64 such that the applicator roll 52 is moved toward or away from the backup roll 51. Subsequently, a signal indicating a change in contact pressure between the backup roll 51 and the applicator roll 52 due to movement of the applicator roll 52 toward or away from the backup roll 51 is again fed back to the control circuit C such that the applicator roll 52 is brought into pressing contact with the backup roll 51 automatically at a preset value based on the contact pressure. Consequently, the backup roll 51 and the applicator roll 52 are maintained at the preset contact pressure therebetween.

Furthermore, if a change in a roll diameter due to replacement of the applicator roll 52, etc. causes difference in the amount of movement between the tables, the pressure between the rolls, when the sensor 63 detects the given contact pressure, is automatically memorized and is designated as an original point of the pressure. Thus, the relation in respect of coating conditions is always kept if the movement is repeated.

Adjustments between the applicator roll 52 and the pickup roll 55 and between the pickup roll 55 and the metering roll 58 are performed in the same manner as described above.

In the event that the coating operation of the coating machine S is started or stopped by moving the first table 54 or that a seam of the workpiece 60 to be coated is temporarily advanced or retracted for cleaning, the roll (contact pressure) between the applicator roll 52 and the backup roll 51 is adjusted by the first pressure adjusting mechanism 61 by moving the first table 54 at said programmed speed.

The second table 56 and the third table 59 are also moved in the same manner as the above described first table 54.

As is clear from the foregoing description, in accordance with the present invention, the contact pressure applied from the applicator roll to the backup roll, the contact pressure applied from the pickup roll to the applicator roll and the pressure between metering roll and the pickup roll is detected by the appropriate sensors. Thereafter, this is compared with the preset value such that the precision ball bearing screw member is driven through the stepping motor, so that the first table and/or the second table is moved relative to the base and/or the first table, whereby the coating amount on the workpiece is automatically controlled precisely.

Furthermore, in accordance with the present invention, since each of the first table and the second table is moved automatically by the use of the stepping motor and the precision ball bearing screw both free from play, it becomes possible to accurately control the thickness of the coating film on the workpiece.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A device for automatically controlling the coating amount of paint deposited on a continuous strip moving between a pair of circular rolls in a coating machine including at least three tandemly located circular rolls that are in continuous adjustable contact with the next adjacent roll in the tandem sequence, said rolls including a circular backup roll and a circular applicator roll of an elastic material with a strip to be coated moveable therebetween, a circular pickup roll in contact with said elastic applicator roll for picking up paint stored in a pickup pan, and a circular metering roll in contact with the circular pickup roll, a fixed base, a first table slidably mounted on said base, and a second table slidably mounted on said first table such that said circular applicator roll and said circular pickup roll are, respectively, slidably secured to said first and said second table for a continuous and automatically adjustable pressure contact between all of said circular rolls, said device comprising:

a present pressure control program for automatically and continuously controlling the pressure adjustment between adjacent individual ones of said above-claimed circular rolls to lie within an equilibrium condition within a predetermined range of pressure;

means for emitting a first preset signal indicative of a desired preset contact pressure range between said circular backup roll and said circular elastic applicator roll while said strip to be coated is moved therebetween;

a first pressure adjusting mechanism coupled between said fixed base and said first table for continuously and automatically adjusting the contact pressure applied from said applicator roll through said backup roll such that said applicator roll is slidably brought into pressing elastic contact with said backup roll at a pressure lying within said predetermined equilibrium pressure range;

means for emitting a second preset signal indicative of a range of desired preset contact pressure between said applicator roll and said pickup roll;

a second pressure adjusting mechanism carried by said first table and coupled between said first and second tables for continuously and automatically adjusting the pressure between said applicator roll and said pickup roll such that said pickup roll is slidably brought in pressing contact with said applicator roll at a pressure lying within said second pressure range therebetween;

said first pressure adjusting mechanism further comprising;

a first sensor in combination with a first precision ball bearing screw member for detecting a first signal representing a contact pressure reaction force of said elastic applicator roll material produced between said applicator roll and said backup roll;

a first comparator circuit means for generating and storing said first detected signal, and means associated with said first comparator circuit for emitting a first difference signal indicative of the difference, if any, between said first preset value range and said first sensor's detected signal value;

a first stepping motor arranged to be intermittently driven through step angle rotation thereof by said first difference signal when said first sensed signal is outside said predetermined range and in accordance with said preset pressure control program;

said first precision ball bearing screw member being further adapted for moving said first table relative to said base upon the intermittent rotation of said first stepping motor such that said applicator roll is slideably moved by steps toward or away from said backup roll at a speed controlled by said preset pressure control program until said desired and controlled preset pressure is achieved within said predetermined range and the reaction force sensed by said first sensor is at a null condition that stops further rotation of said first stepping motor;

said second pressure adjusting mechanism further comprising;

a second sensor in combination with a second precision ball bearing screw member detecting a second signal representing a contact pressure reaction force of said elastic applicator roll material produced between said pickup roll and said elastic applicator roll;

a second comparison circuit means for generating and storing said second sensor's detected signal, and means associated with said second comparator circuit for emitting a second difference signal indicative of the difference, if any, between said second preset value range and said second sensor's detected value;

a second stepping motor arranged to be intermittently driven through step angle rotation thereof in accordance with said second difference signal when said second signal is outside said second predetermined range and in accordance with said preset pressure control program; and said second precision ball bearing screw member being further adapted for moving said second table relative to said first table upon the intermittent rotation of said second stepping motor such that said pickup roll is slidably moved by steps toward or away from said applicator roll at a speed controlled by said preset pressure control program until said second desired and controlled preset pressure is achieved and said reaction force sensed by said second sensor is at a null condition that stops further rotation of said second stepping motor.

2. A device as claimed in claim 1, further including a third table slidably mounted on said second table such that said metering roll is secured to said third table.

3. A device as claimed in claim 1, wherein each of said first pressure adjusting mechanism and said second pressure adjusting mechanism further comprises a presetter for defining each of the first preset contact pressure and the second preset contact pressure, and wherein said first and second comparators include a series connected circuit having a coincidence gate and a driver unit, together with an oscillator adapted to feed driving pulses through said gate and driver unit to said stepping motor circuit when said gate circuit is in an enabled condition.

4. A device for automatically controlling coating amount for use in a coating machine including a circular backup roll mounted for rotation on a backup axle, and an elastic circular applicator roll mounted for rotation on an applicator axle, a circular pickup roll mounted for rotation on a pickup axle for picking up paint stored in a pickup pan, a base, a first table slidably mounted to move said applicator roll and its axle on said base, and a second table slidably mounted on said first table to move said pick up roll and its axle along with said second table such that said elastic applicator roll and pickup roll are, respectively, secured to and move with said first table and with said second table, respectively, said device comprising:

a first contact adjusting mechanism for automatically and continuously adjusting a contact pressure between said backup roll and said elastic applicator roll by moving the first table, the applicator roll and its axle such that said elastic applicator roll is automatically brought into pressing contact with said backup roll at a first preset value representing a first preset contact pressure therebetween; and a second contact adjusting and continuously mechanism moveable both on said first contact adjusting mechanism and also automatically adjustable independently from said first adjusting mechanism, for automatically adjusting a contact pressure between said elastic applicator roll and said pickup roll by moving the pickup roll and its axle such that said pickup roll is brought into pressing contact with said applicator roll at a second preset value representing a second preset contact pressure until said elastic applicator roll is in a continuous equilibrium state between said backup and said elastic pickup rolls in the presence of swells in said rolls or a seam in said workpiece being coated while said automatic adjustment is taking place.

5. A device in accordance with claim 4 wherein said first contact adjusting mechanism further comprises:
   a first sensor for detecting a first signal representing a contact pressure produced between said elastic applicator roll and said backup roll; and
   a first stepping motor arranged to be driven for rotation in accordance with said difference signal between the first signal detected by said first sensor and the first preset value.

6. A device in accordance with claim 5 and further comprising:
   a first precision ball screw for moving said first table relative to said base upon the rotation of said first stepping motor such that said elastic applicator roll is moved toward or away from said backup roll.

7. A device in accordance with claim 6 wherein said second contact adjusting mechanism further comprises:
   a second sensor for detecting a second signal representing a contact pressure produced between said pickup roll and said elastic applicator rolls; and
   a second stepping motor arranged to be driven for rotation in accordance with said difference signal between the second signal detected by said second sensor and the second preset value.

8. A device in accordance with claim 7 and further comprising:
   a second precision ball bearing screw member for moving said second table relative to said first table upon the rotation of said second stepping motor such that said pickup roll is moved toward or away from said elastic applicator roll.

9. A device as claimed in claim 4 and further including:
   a metering roll; and
   a third table slidably mounted on said second table such that said metering roll is secured to said third table and is adjustable toward or away from said pickup roll.

10. A device as claimed in claim 9, and further comprising a third pressure adjusting mechanism, said third pressure adjusting mechanism comprising:
    a third sensor for detecting a signal representing contact pressure produced between said metering roll and said pickup roll; and
    a third stepping motor arranged to be driven for rotation thereof in accordance with a difference between the signal detected by said third sensor and the third preset value.

11. A device in accordance with claim 10 and further comprising:
    a third precision ball bearing screw member for moving said third table relative to said second table upon the rotation of said third stepping motor such that said metering roll is moved toward or away from said pickup roll.

12. A device as claimed in claim 11 wherein each of said first and second pressure adjusting mechanisms each further comprises:
    a presetter for defining each of the first preset contact pressure and the second preset contact pressure; and
    wherein said first and second comparators each include a series-connected circuit having a coincidence gate and a driver unit, with an oscillator adapted to feed driving pulses through said coincidence gate and the driver unit to each of said stepping motor circuits when said coincidence gate circuit is in an enabled condition.

13. In a control device for automatically controlling the amount of paint applied to an elongated sheet having a backup roll supporting the sheet which contains an enlarged seam therein, an applicator roll for applying the paint, a pickup roll for picking up the paint stored in a pickup pan, a support base, a first table slidably mounted on said base, and a second table slidably mounted on said first table such that said applicator roll and said pickup roll are, respectively, secured to said first table and said second table, the improvement comprising:
    an elasticized coating on said applicator roll with said elasticized applicator roll being positioned in tandem with said other rolls and located between said pickup and said backup rolls;
    a first contact adjusting mechanism for adjusting a contact pressure between said backup roll and said elasticized applicator roll such that said applicator roll is brought into pressing contact with said backup roll at a first preset value representing a first preset contact pressure therebetween;
    a second contact adjusting mechanism for adjusting a contact pressure between said elasticized applicator roll land said pickup roll such that said pickup roll is brought into pressing contact with said applicator roll at a second preset value representing a second preset contact pressure therebetween;
    means for storing and generating electrical signals representative of said first and second preset contact pressure values;
    said first contact adjusting mechanism further consisting of a first sensor means for producing a first signal representing the actual contact pressure between said elasticized applicator roll and said backup roll, and a first stepping motor arranged to be electrically driven for rotation thereof in accordance with a difference signal between the actual contact pressure signal detected by said first sensor and the first preset value;
    a first precision member for automatically moving both said first table and said second contact adjusting mechanism relative to said base in response to said first difference signal by rotation of said first stepping motor such that said elasticized applicator roll is moved toward or away from said backup roll;
    said second contact adjusting mechanism further consisting of;
    a second sensor means for producing a second signal representing a contact pressure produced between said pickup roll and said elasticized applicator roll;
    a second stepping motor arranged to be electrically driven for rotation thereof in accordance with a difference between the second signal detected by said second sensor and the second preset value; and a second precision member for automatically moving said second table relative to said first table upon the rotation of said second stepping motor such that said pickup roll is moved toward or away from said elasticized applicator roll, said adjustments of the respective first and second contact adjusting mechanisms independently and automatically being implemented continuously to place all of said tandem rolls in an equilibrium state that assures a constant amount of paint being applied to the sheet in the presence of said seam in another sheet, which seam disrupts the pressure between said tandem rolls were it not for the continuous adjustment of said first and second contact adjustment mechanisms.

* * * * *